US007222007B2

(12) United States Patent
Xu et al.

(10) Patent No.: US 7,222,007 B2
(45) Date of Patent: May 22, 2007

(54) ATTITUDE SENSING SYSTEM FOR AN AUTOMOTIVE VEHICLE RELATIVE TO THE ROAD

(75) Inventors: Li Xu, Belleville, MI (US); Todd Allen Brown, Dearborn, MI (US); Joseph Carr Meyers, Farmington Hills, MI (US); Hongtei Eric Tseng, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 687 days.

(21) Appl. No.: 10/752,741

(22) Filed: Jan. 7, 2004

(65) Prior Publication Data

US 2005/0149240 A1 Jul. 7, 2005

(51) Int. Cl.
*G06F 17/10* (2006.01)
(52) U.S. Cl. .............................. 701/38; 701/36; 701/39; 180/252; 340/440
(58) Field of Classification Search .................. 701/38, 701/45–46; 180/252; 340/440
See application file for complete search history.

(56) References Cited

U.S. PATENT DOCUMENTS

| 6,002,974 | A | * | 12/1999 | Schiffmann ................... 701/36 |
| 6,002,975 | A | * | 12/1999 | Schiffmann et al. .......... 701/36 |
| 6,073,065 | A | | 6/2000 | Brown et al. |
| 6,263,261 | B1 | * | 7/2001 | Brown et al. .................... 701/1 |
| 6,654,671 | B2 | * | 11/2003 | Schubert ......................... 701/1 |
| 6,834,218 | B2 | * | 12/2004 | Meyers et al. ................... 701/1 |
| 6,904,350 | B2 | * | 6/2005 | Lu et al. .......................... 701/70 |
| 7,079,928 | B2 | * | 7/2006 | Lu et al. ......................... 701/38 |
| 7,085,639 | B2 | * | 8/2006 | Lu et al. ......................... 701/45 |
| 7,109,856 | B2 | * | 9/2006 | Lu et al. ....................... 340/440 |
| 7,130,735 | B2 | * | 10/2006 | Brown et al. .................. 701/70 |
| 7,132,837 | B1 | * | 11/2006 | Tao ............................. 324/693 |

(Continued)

FOREIGN PATENT DOCUMENTS

DE 60023640 E * 12/2005

(Continued)

OTHER PUBLICATIONS

Williams et al., An evaluation of an integrated V/STOL display concept, IEEE Trans. on Human Factors in Electronics, vol. HFE-8, No. 2, Jun. 1967, pp. 158-165.*

(Continued)

*Primary Examiner*—Cuong Nguyen
(74) *Attorney, Agent, or Firm*—Fredrick Owens

(57) ABSTRACT

A system (18) for controlling a safety system (44) of an automotive vehicle (10) includes a longitudinal acceleration sensor (36), a vehicle speed sensor (20), a lateral acceleration sensor (32), a yaw rate sensor, and a controller (26). The controller (26) determines a reference pitch in response to the longitudinal acceleration signal and the vehicle speed signal and a reference roll angle in response to the yaw rate signal, the wheel speed signal and the lateral acceleration signal. The controller (26) determines a roll stability index and a pitch stability index. The controller (26) determines an adjusted pitch angle in response to the reference pitch angle and the pitch stability index and an adjusted roll angle in response to the reference roll angle and the roll stability index. The controller (26) controls the safety system (44) in response to the adjusted roll angle and the adjusted pitch angle.

33 Claims, 6 Drawing Sheets

U.S. PATENT DOCUMENTS

| | | | | |
|---|---|---|---|---|
| 7,136,731 | B2* | 11/2006 | Lu et al. | 701/38 |
| 2003/0158633 | A1* | 8/2003 | Schubert | 701/1 |
| 2005/0149240 | A1* | 7/2005 | Tseng et al. | 701/38 |

FOREIGN PATENT DOCUMENTS

| | | | | |
|---|---|---|---|---|
| DE | 69930594 | E | * | 5/2006 |
| EP | 983919 | A2 | * | 3/2000 |
| EP | 1110835 | A2 | * | 6/2001 |
| EP | 1110835 | B1 | * | 11/2005 |
| EP | 983919 | B1 | * | 3/2006 |
| JP | 2001219840 | A | * | 8/2001 |

OTHER PUBLICATIONS

W. W. Kinston, Visual display techniques in vehicle stabilization and control, presented at the 6th Nati'l Symp. Soc. for Information Display, New York, Sep. 1965.*

Mike Horton et al., A dual-axis tilt sensor based on micromachined accelerometer, Sensors, Apr. 1996, pp. 91-94.*

Peter Steiner et al., Roll-over detection, SAE Technical Paper Series, Feb. 24-27, 1997, pp. 45-49.*

Frere, Problems of using accelerometers to measure angular rate in automobiles, Sensors and actuators, Apr. 25-27, 1991, pp. 821-824.*

Wielenga, A method for reducing on-road rollovers/ anti-rollover braking, Dynamotive, LLC., International Congress and Exposition Detroit, Michigan, Mar. 1-4, 1999, cited by other.*

Eger et al., Modeling of rollover sequences, Control Engineering Practice 11 (2003) 209-216, cited by other.*

Chen et al., A realtime rollover threat index for sports utility vehicles, Proceedings of the American Control Conference, San Diego, CA Jun. 1999, cited by other.*

Tseng, H.E., Ashrafi, B, Madau, D., Brown, T., Recker, D: "The Development of Vehicle Stability Control at Ford"; Ford Motor Company/Visteon Automotive Systems.

Abe, Masato: "On Advanced Chassis Control Technology for Vehicle Handling and Active Safety", AVEC '96 International Symposium on Advanced Vehicle Control, Aachen University of Technology, Jun. 24-28, 1996.

Fukada, Yoshiki: "Slip-Angle Estimation for Vehicle Stability Control", Vehicle System Dynamics, 32 (1999), pp. 375-388.

Ryu, J., Rossetter, E., Gerdes, J.,: "Vehicle Sideslip and Roll Parameter Estimation Using GPS", Dept. of Mechanical Engineering, Stanford University, Design Division.

Nagai, M., Yamanaka, S., "Integrated Control Law of Active Rear Wheel Steering and Direct Yaw Moment Control", AVEC '96 International Symposium on Advanced Vehicle Control, Aachen University of Technology, Jun. 24-28, 1996.

Nishio, A., Tozu, K., Yamaguchi, H., Asano, K., Amano, Y: "Development of Vehicle Stability Control System Based on Vehicle Sideslip Angle Estimation", SAE 2001 World Congress, Detroit, MI, Mar. 5-8, 2001.

Van Zantan, A., Erhardt, R., Pfaff, G., Kost, F., Hartmann, U., Ehret, T.: "Control Aspects of the Bosch-VCD", AVEC'96 International Symposium on Advanced Vehicle Control, Aachen University of Technology, Jun. 24-28, 1996.

Tseng, H.E.: "Dynamic Estimation of Road Bank Angle", Vehicle Dynamic Systems 2001, vol. 36, No. 4-5, pp. 307-328.

* cited by examiner

ATTITUDE SENSING SYSTEM FOR AN AUTOMOTIVE VEHICLE RELATIVE TO THE ROAD

TECHNICAL FIELD

The present invention relates generally to a control apparatus for controlling a system of an automotive vehicle in response to sensed dynamic behavior, and more specifically, to a method and apparatus for controlling the system of the vehicle by determining attitude of the vehicle.

BACKGROUND

In recent years, many vehicle control systems have been developed to enhance vehicle stability and tracking performance in critical dynamic situations. Such vehicle control systems include yaw stability control systems, roll stability control systems, integrated vehicle dynamic control systems, etc. In these systems, knowledge of the vehicle roll and pitch attitude is very important. For example, in yaw stability control systems the effect of vehicle body roll and pitch, as well as the dynamically changing road superelevations and road grades is significant because they directly influence both the vehicle lateral dynamics and lateral acceleration measurements. In roll stability control systems, roll angle is one of the most important variables used to construct feedback pressure command and combat the detected roll instability. Hence a successful vehicle dynamics control must involve an accurate determination of the vehicle roll and pitch attitude. However, these values are not directly measured on production vehicles and therefore must be estimated instead.

The vehicle state estimation algorithms implemented on a production vehicle for vehicle dynamic control purpose is normally based on dead reckoning sensors only, such as wheel/steering encoders and inertia sensors which are utilized to predict the vehicle's high frequency behavior. The vehicle state estimates can be obtained from a physical vehicle model, or via integration of the inertial sensor signals, or a combination of both. The estimation accuracy, however, can be very crude for a lot of maneuvers/road conditions, which in turn severally limits the control performance. One reason is that the vehicle model is only effective in the linear region. Another, perhaps more important, reason is that there is simply not enough inertia information. In order to accurately estimate vehicle states in all operating modes, a full six-degree-of-freedom inertial measurement unit (IMU) may be used. A typical IMU consists of three accelerometers and three gyroscopes mounted in a set of three orthogonal axes. The IMU measures the acceleration and the rotation rate of the vehicle in all three dimensions at a high sampling rate, typically at frequencies higher than 100 Hz. From this information, attitude and velocity of the vehicle can be derived via mathematical integration. Vehicle position and heading are generally not observable without external information.

Recent progress in the development of Micro-Electro Mechanical Systems (MEMS) has made it possible to put IMU on production vehicles because of their small size, low cost and ruggedness. The reduction in size and cost, especially cost, however, has also led to a drop in accuracy of the inertial unit as a whole. The predominant error sources in the inertial sensors, whether they are gyros or accelerometers, are bias, scale factors and random walk. These errors are added up via mathematical integration, and may lead to large drifts in the attitude and velocity estimates, unless external absolute sensors are used to constantly bound the errors.

In practice, all inertia sensing systems are aided in some way by low frequency external sensors, such as global positioning system (GPS), Doppler radar, star trackers to name a few. Due to the increasing popularity and decreasing cost of GPS, a lot of effort has been devoted to the development of GPS aided inertial systems for vehicle control purpose. While fairly good estimation accuracy can be attained in open sky environment using this approach, the performance deteriorates when the satellite signals bounce off of reflective surfaces such as tall buildings and other structures in the "urban canyon". In the worst case, when fewer than three or four satellites can be "seen" (i.e., driving through a tunnel), the GPS provides no information to bound the errors associated with high frequency inertia sensors. Another disadvantage is that GPS device is not at all common and/or cost effective on current production vehicles.

Therefore, there is a significant need for a low-cost device that provides accurate and robust estimate of the vehicle global attitude.

SUMMARY OF THE INVENTION

It is the primary objective of the present invention to provide a methodology of estimating the vehicle global roll angle and pitch angle. The present invention determines an estimated vehicle attitude that can be used to initiate control commands for various subsystems including but not limited to powertrain controls, brake controls, steering controls, suspension controls and passive safety devices. Another application of vehicle global attitude is sensor fault detection.

One embodiment uses the following dead reckoning sensors: (i) a low-cost strapdown IMU sensor cluster, (ii) a steering wheel angle sensor, (iii) and wheel speed sensors. The proposed methodology utilizes the kinematic relationship among sensor signals, a bicycle model, and the nonholonomic constraints for a vehicle moving on a surface. The vehicle global attitude is obtained via a fusion of the data from all the sensors.

In another embodiment, a system for controlling a safety system of an automotive vehicle includes a longitudinal acceleration sensor generating a longitudinal acceleration signal, a vehicle speed sensor generating a vehicle speed signal, a lateral acceleration sensor generating a lateral acceleration signal, a yaw rate sensor generating a yaw rate signal and a controller. The controller determines a reference pitch in response to the longitudinal acceleration signal and the vehicle speed signal and a reference roll angle in response to the yaw rate signal, the wheel speed signal and the lateral acceleration signal. The controller determines a roll stability index and a pitch stability index. The controller determines an adjusted pitch angle in response to the reference pitch angle and the pitch stability index and an adjusted roll angle in response to the reference roll angle and the roll stability index. The controller controls the safety system 44 in response to the adjusted roll angle and the adjusted pitch angle.

The present invention provides a technique of qualifying different sensor signals so that they can be fused to accurately estimate the vehicle attitude. A number of criteria are proposed for identifying cases that are not suitable for using one sensor signal but suitable for using others. As a result, the proposed sensing algorithm is robust to sensor bias and noise, vehicle maneuvers, vehicle parameter variation, road disturbances and the friction coefficient between the tires and the road.

The present invention allows the vehicle performance to be optimized for ride, safety and fuel economy by providing an accurate estimate of the vehicle attitude. Even in future vehicle models equipped with standard GPS devices, the proposed methodology is able to help achieve desired performance when sky-obstruction/GPS faults occur.

Other advantages and features of the present invention will become apparent when viewed in light of the detailed description of the preferred embodiment when taken in conjunction with the attached drawings and appended claims.

DETAILED DESCRIPTION

Figure 1:
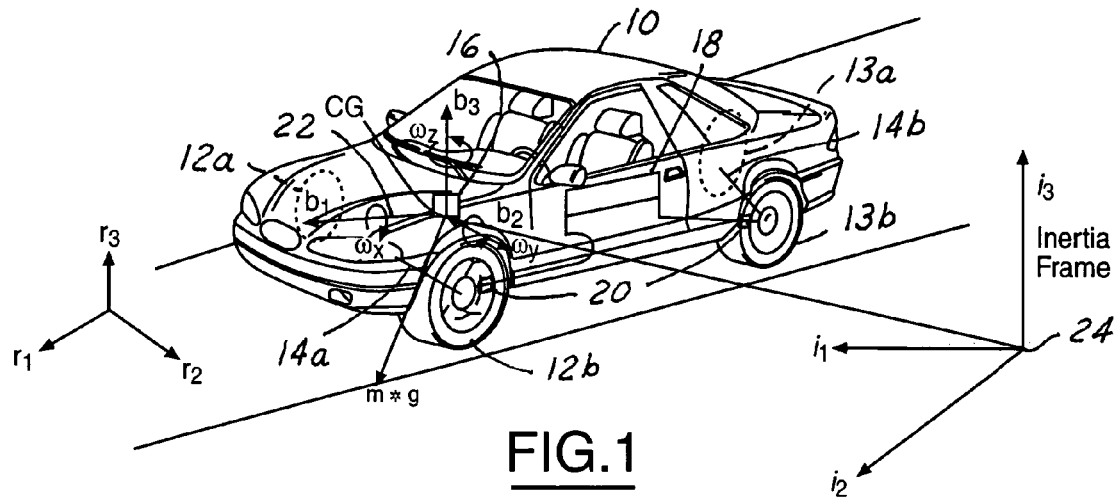
FIG. 1 is a diagrammatic view of a vehicle with variable vectors and coordinator frames according to the present invention.

In the following figures the same reference numerals will be used to identify the same components.

The present invention may be used in conjunction with a rollover control system for a vehicle. However, the present invention may also be used with a deployment device such as airbag or roll bar. The present invention will be discussed below in terms of preferred embodiments relating to an automotive vehicle moving in a three-dimensional road terrain.

Referring to FIG. 1, an automotive vehicle 10 with a safety system of the present invention is illustrated with the various forces and moments thereon during a rollover condition. Vehicle 10 has front right and front left tires 12a and 12b and rear right tires 13a and left rear tires 13b respectively. The vehicle 10 may also have a number of different types of front steering systems 14a and rear steering systems 14b including having each of the front and rear wheels configured with a respective controllable actuator, the front and rear wheels having a conventional type system in which both of the front wheels are controlled together and both of the rear wheels are controlled together, a system having conventional front steering and independently controllable rear steering for each of the wheels or vice versa. Generally, the vehicle has a weight represented as Mg at the center of gravity of the vehicle, where g=9.8 m/s² and M is the total mass of the vehicle.

As mentioned above, the system may also be used with active/semi-active suspension systems, anti-roll bar or other safety devices deployed or activated upon sensing predetermined dynamic conditions of the vehicle.

The sensing system 16 is coupled to a control system 18. The sensing system 16 may use a standard yaw stability control sensor set (including lateral accelerometer, yaw rate sensor, steering angle sensor and wheel speed sensor) together with a roll rate sensor and a longitudinal accelerometer. The various sensors will be further described below. The wheel speed sensors 20 are mounted at each corner of the vehicle, and the rest of the sensors of sensing system 16 are preferably mounted directly on the center of gravity of the vehicle body, along the directions x, y and z shown in FIG. 1. As those skilled in the art will recognize, the frame from $b_1$, $b_2$ and $b_3$ is called a body frame 22, whose origin is located at the center of gravity of the car body, with the $b_1$ corresponding to the x axis pointing forward, $b_2$ corresponding to the y axis pointing off the driving side (to the left), and the $b_3$ corresponding to the z axis pointing upward. The angular rates of the car body are denoted about their respective axes as $\omega_x$ for the roll rate, $\omega_y$ for the pitch rate and $\omega_z$ for the yaw rate. The present invention calculations preferably take place in an inertial frame 24 that may be derived from the body frame 22 as described below.

The angular rate sensors and the accelerometers are mounted on the vehicle car body along the body frame directions $b_1$, $b_2$ and $b_3$; which are the x-y-z axes of the vehicle's sprung mass.

The longitudinal acceleration sensor is mounted on the car body located at the center of gravity, with its sensing direction along $b_1$-axis, whose output is denoted as $\alpha_x$. The lateral acceleration sensor is mounted on the car body located at the center of gravity, with its sensing direction along $b_2$-axis, whose output is denoted as $\alpha_y$.

The other frame used in the following discussion includes the road frame, as depicted in FIG. 1. The road frame system $r_1 r_2 r_3$ is fixed on the driven road surface, where the $r_3$ axis is along the average road normal direction computed from the normal directions of the four tire/road contact patches.

In the following discussion, the Euler angles of the body frame $b_1 b_2 b_3$ with respect to the road frame $r_1 r_2 r_3$ are denoted as $\theta_{xbr}$, $\theta_{ybr}$ and $\theta_{zbr}$, which are also called the relative Euler angles.

The present invention estimates the relative Euler angles $\theta_{xbr}$ and $\theta_{ybr}$ based on the available sensor signals and the signals calculated form the measured values.

Figure 2:
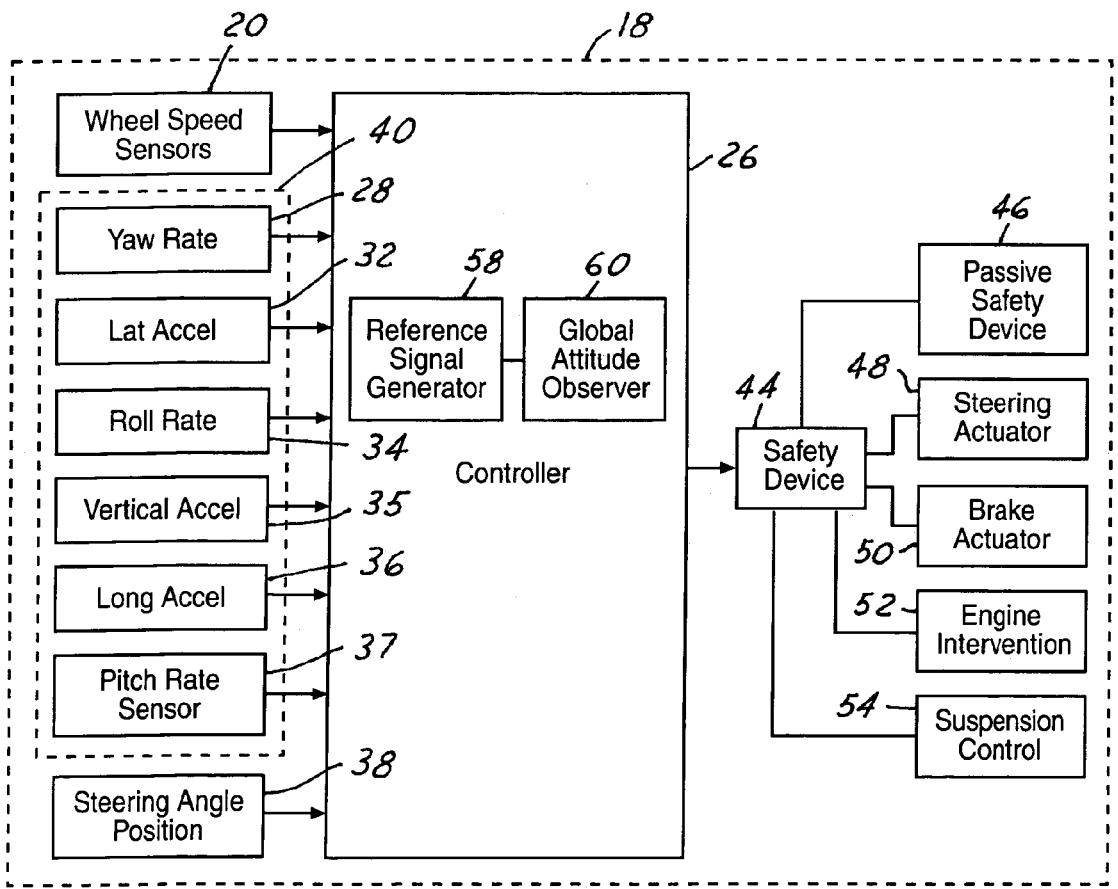
FIG. 2 is a block diagram of a stability system according to the present invention.

Referring now to FIG. 2, roll stability control system 18 is illustrated in further detail having a controller 26 used for receiving information from a number of sensors which may include speed sensors 20, a yaw rate sensor 28, a lateral acceleration sensor 32, a roll rate sensor 34, a vertical acceleration sensor 35, a longitudinal acceleration sensor 36, a pitch rate sensor 37 and steering angle position sensor 38. Sensors 28–38 may be part of an integrated measurement unit 40 or IMU.

In the preferred embodiment the sensors are located at the center of gravity of the vehicle. Those skilled in the art will recognize that the sensor may also be located off the center of gravity and translated equivalently thereto.

Lateral acceleration, roll orientation and speed may be obtained using a global positioning system (GPS). Based upon inputs from the sensors, controller 26 may control a safety device 44. Depending on the desired sensitivity of the system and various other factors, not all the sensors 28–38 may be used in a commercial embodiment. Safety device 44 is part of a vehicle subsystem control. Safety device 44 may control a passive safety device 46 such as an airbag or a steering actuator 48, a braking actuator 50 at one or more of the wheels 12a, 12b, 13a, 13b of the vehicle. Engine intervention 52 may act to reduce engine power to provide a safety function. Also, other vehicle components such as a suspension control 54 may be used to adjust the suspension to prevent rollover.

Roll rate sensor 34 and pitch rate sensor 37 may sense the roll condition of the vehicle based on sensing the height of one or more points on the vehicle relative to the road surface. Sensors that may be used to achieve this include a radar-based proximity sensor, a laser-based proximity sensor and a sonar-based proximity sensor.

Roll rate sensor 34 and pitch rate sensor 37 may also sense the roll condition based on sensing the linear or rotational relative displacement or displacement velocity of one or more of the suspension chassis components which may include a linear height or travel sensor, a rotary height or travel sensor, a wheel speed sensor used to look for a change in velocity, a steering wheel position sensor, a steering wheel velocity sensor and a driver heading command input from an electronic component that may include steer by wire using a hand wheel or joy stick.

The roll condition may also be sensed by sensing the force or torque associated with the loading condition of one or more suspension or chassis components including a pressure transducer in an act of air suspension, a shock absorber sensor such as a load cell, a strain gauge, the steering system absolute or relative motor load, the steering system pressure of the hydraulic lines, a tire laterally force sensor or sensors, a longitudinal tire force sensor, a vertical tire force sensor or a tire sidewall torsion sensor.

The roll condition of the vehicle may also be established by one or more of the following translational or rotational positions, velocities or accelerations of the vehicle including a roll gyro, the roll rate sensor 34, the yaw rate sensor 28, the lateral acceleration sensor 32, a vertical acceleration sensor, a vehicle longitudinal acceleration sensor, lateral or vertical speed sensor including a wheel-based speed sensor, a radar-based speed sensor, a sonar-based speed sensor, a laser-based speed sensor or an optical-based speed sensor.

Steering control 48 may control the position of the front right wheel actuator, the front left wheel actuator, the rear left wheel actuator, and the right rear wheel actuator. Although as described above, two or more of the actuators may be simultaneously controlled. For example, in a rack-and-pinion system, the two wheels coupled thereto are simultaneously controlled. Based on the inputs from sensors 28 through 38, controller 26 determines a roll condition and controls the steering position of the wheels.

Speed sensor 20 may be one of a variety of speed sensors known to those skilled in the art. For example, a suitable speed sensor may include a sensor at every wheel that is averaged by controller 26. Preferably, the controller translates the wheel speeds into the speed of the vehicle. Yaw rate, steering angle, wheel speed and possibly a slip angle estimate at each wheel may be translated back to the speed of the vehicle at the center of gravity. Various other algorithms are known to those skilled in the art. Speed may also be obtained from a transmission sensor. For example, if speed is determined while speeding up or braking around a corner, the lowest or highest wheel speed may not be used because of its error. Also, a transmission sensor may be used to determine vehicle speed.

Controller 26 may include a reference signal generator 58 and a global attitude observer 60. While these functions are provided by controller 26, several controllers may be used to provide the same functions. The controller 26 may be programmed to provide both of the functions among other functions. A global roll and global pitch angle are provided by the global attitude observer 60 which is then provided to device 44. One, several, or all of the safety devices in the vehicle may use global pitch and global roll angles determined by the global attitude observer 60.

Figure 3:
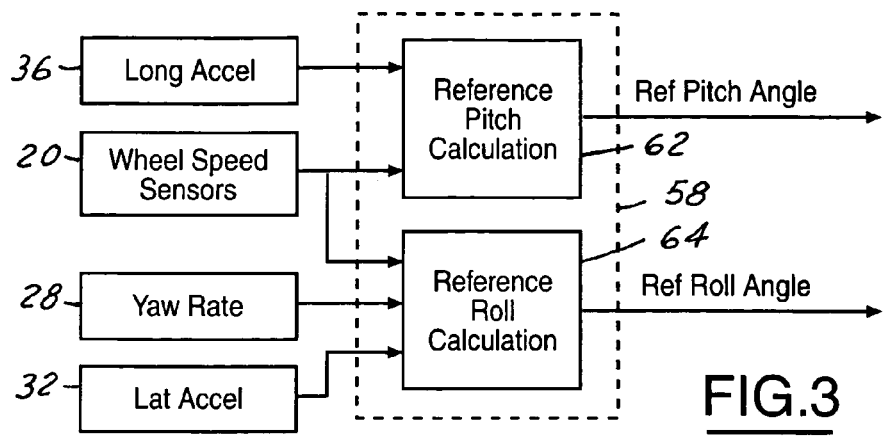
FIG. 3 is a block diagrammatic view of reference signal generation according to the present invention.

Referring now to FIG. 3, reference signal generator 58 is illustrated in further detail. The reference pitch calculation box 62 determines a reference pitch angle in response to the longitudinal acceleration signal from the longitudinal acceleration sensor 36 and the wheel speed sensors 20.

A reference roll calculation block 64 determines a reference roll angle in response to a yaw rate signal from a yaw rate sensor 28 and a lateral acceleration signal from a lateral acceleration sensor 32. A derivation of these signals will be further described below.

Figure 4:
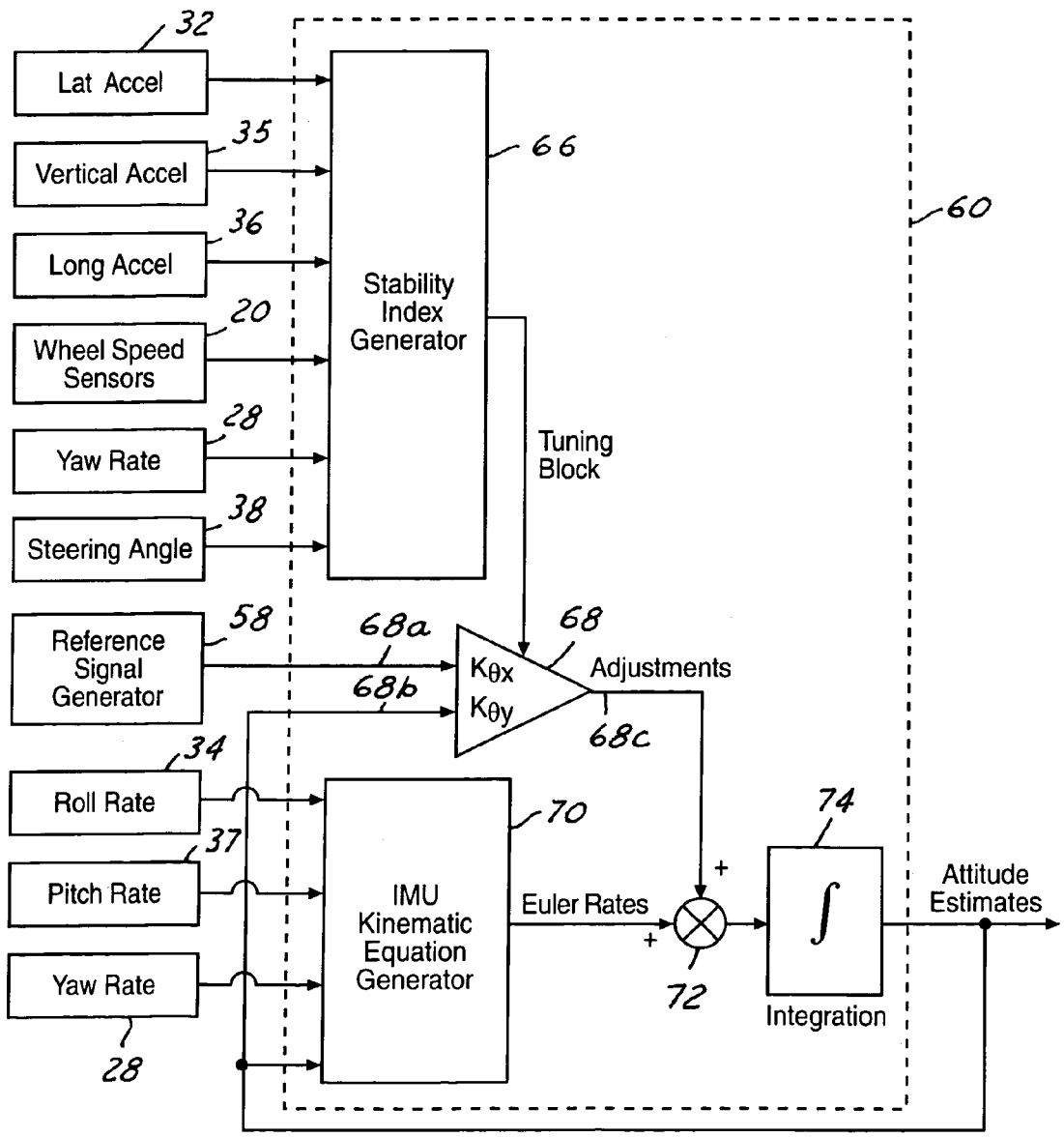
FIG. 4 is a block diagrammatic view of the global observer according to one embodiment of the present invention.

Referring now to FIG. 4, the global attitude observer 60 is illustrated in further detail. Inputs include the sensors illustrated above and the reference signals from the reference signal generator 58 illustrated in FIG. 3. The global attitude observer 60 includes a stability index generator 36 that is coupled to wheel speed sensors 20, lateral acceleration sensor 32, vertical acceleration sensor 35, longitudinal acceleration sensor 36, yaw rate sensor 28, and steering angle sensor 38. A stability index signal is generated by the stability index generator 66. This signal is provided to a tuning block 68. The tuning block 68 has an input 68A coupled to reference signal generator 58. A second input 68B is coupled to the ultimate output of the global attitude observer. $K_{\theta x}$ and $K_{\theta y}$ are non-negative tunable observer gains and may be referred to as a roll stability index and a pitch stability index, respectively. Thus, the observer gains are determined based on vehicle stability status by the stability index generator 66. When the vehicle is stable, the reference signals are normally very accurate and the observer gain should be increased as a rule. In such cases the reference signals are trusted more and the gyro integrations are trusted less. On the other hand, as the vehicle becomes unstable, the reference signals normally are not very reliable. The tunable observer gain should reduce so that the estimates rely more on the gyro integrations as will be further described below.

An IMU kinematic equation generator 70 is coupled to the roll rate sensor 34, the pitch rate sensor 37, and the yaw rate sensor 38. The IMU kinematic equation generator generates a plurality of kinematic signals that are integrated to determine the Euler rates of change of the pitch and roll of the vehicle. The output of the IMU kinematic equation generator 70 and the output 68C of tuning block 68 are provided to a summing block 72. The adjustments referred to below as $\Delta_{\theta y}, \Delta_{\theta x}$ are summed together and provided to integration block 78. The integration block 78 determines the pitch and roll angles of the vehicle as will be further described below.

Figure 5:
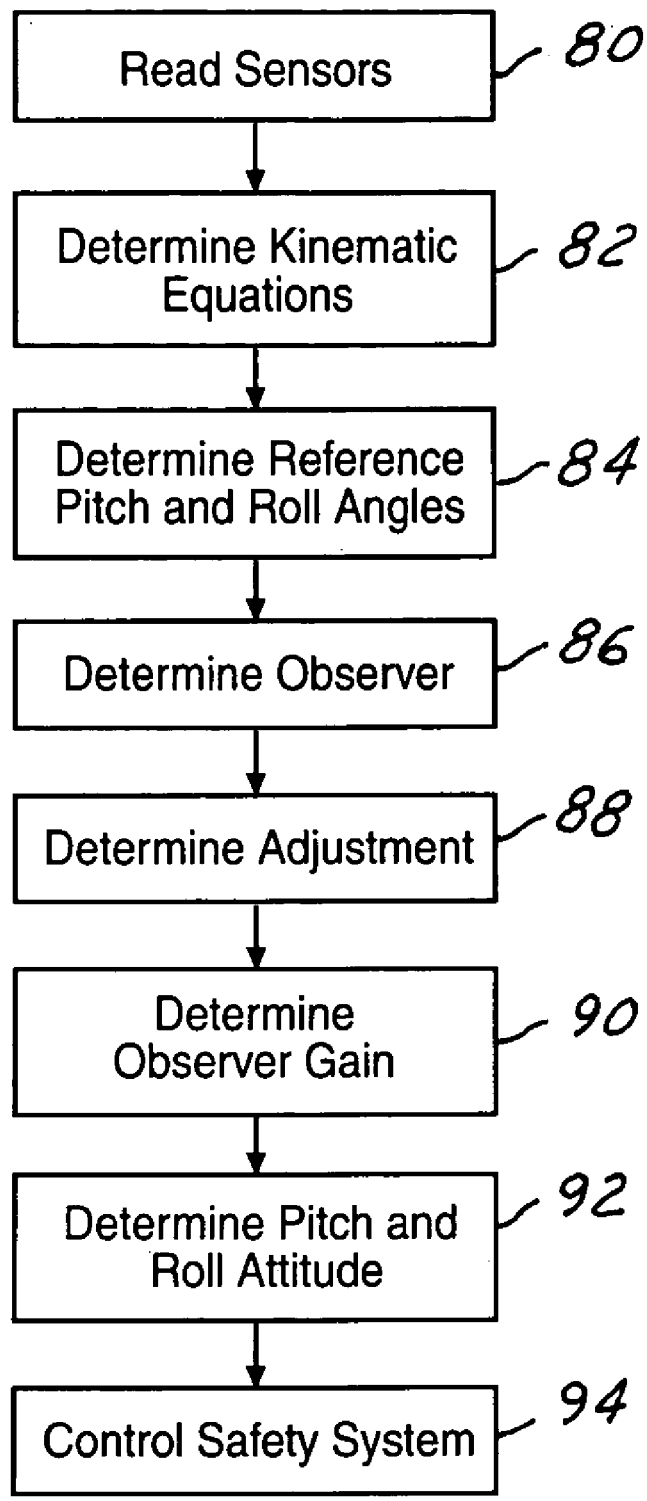
FIG. 5 is flow chart of the pitch and attitude determination according to the present invention.
Figure 6A:
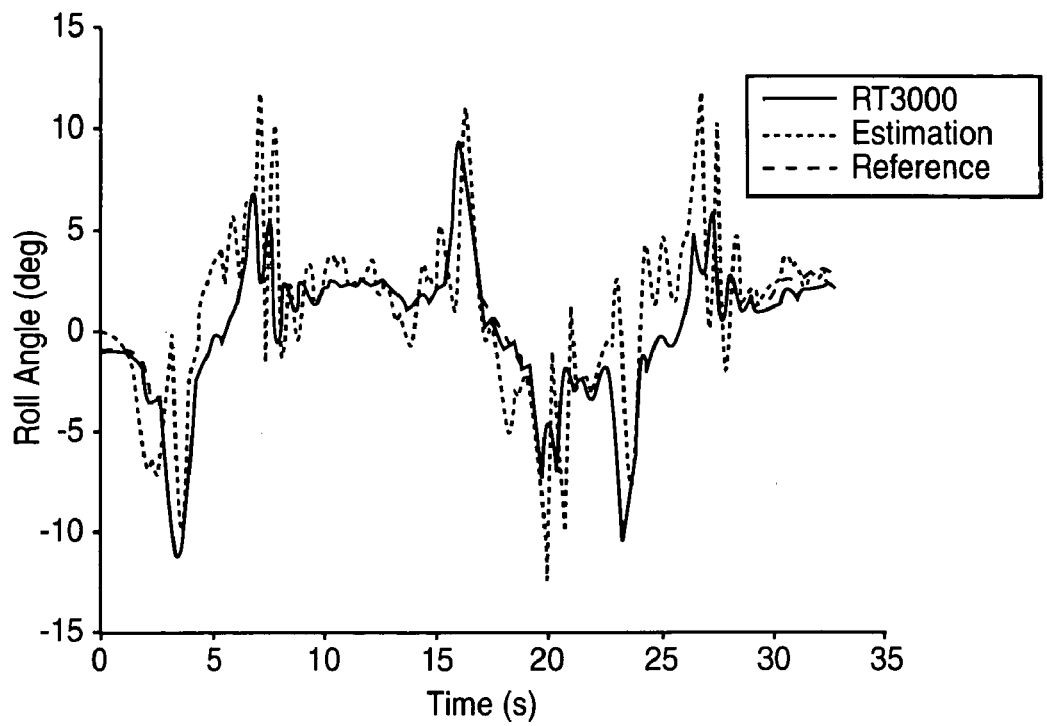
FIGS. 6A and 6B are respective roll angle and pitch angle plots versus time of a calculated reference, an estimation according to the present invention, and an accurate measuring device in a drive away event.
Figure 6B:
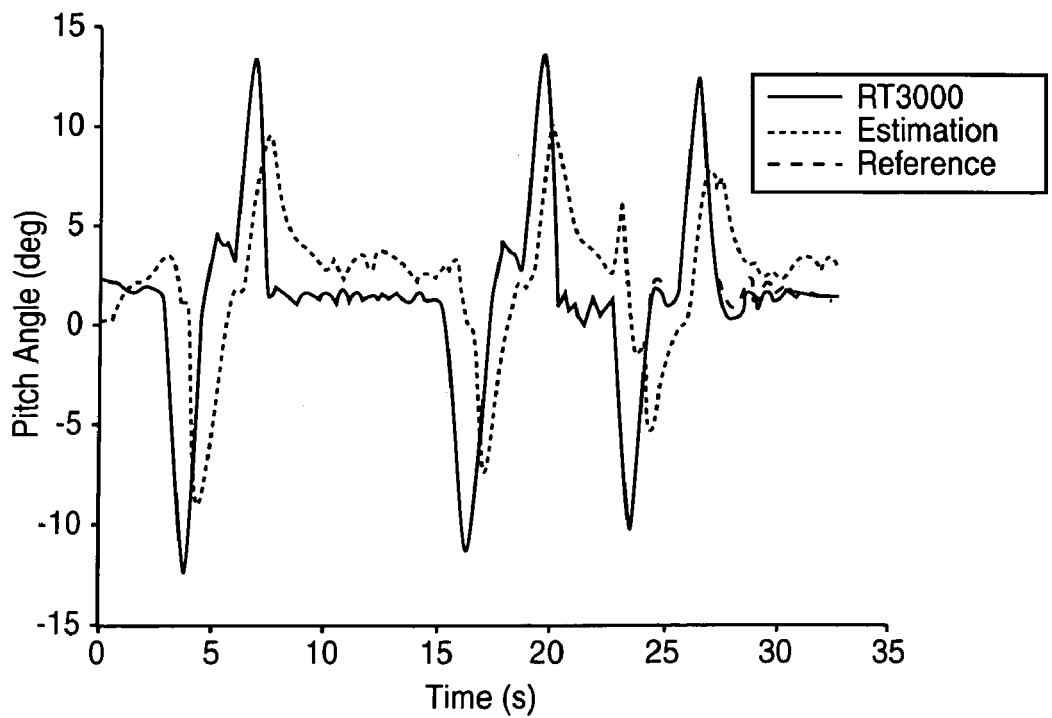
Figure 7A:
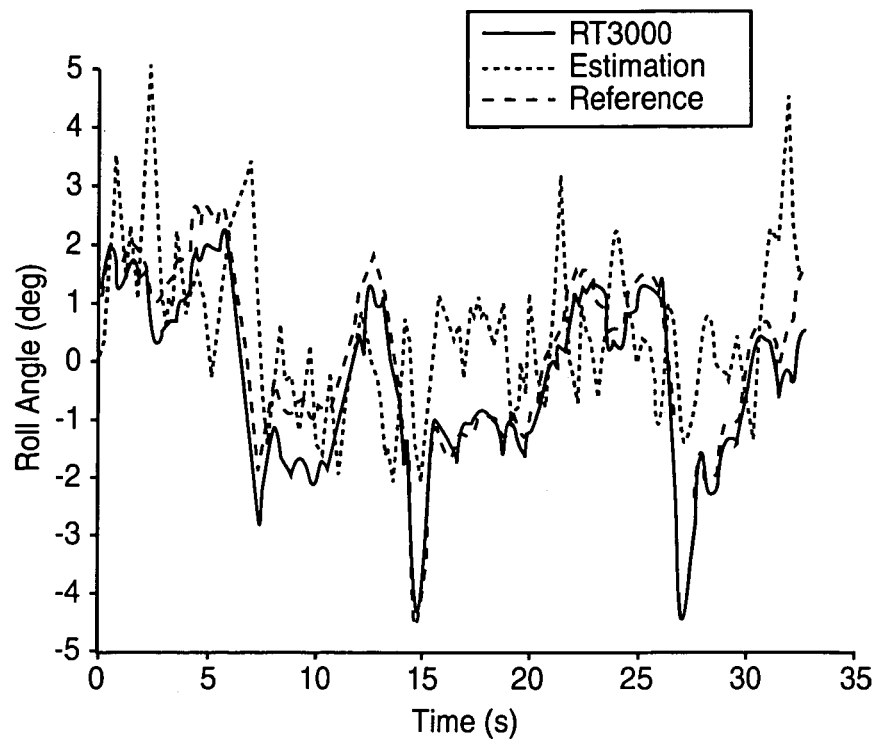
FIGS. 7A and 7B are respective roll angle and pitch angle plots versus time of a calculated reference, an estimation according to the present invention, and an accurate measuring device in a slow build up of side slip on truck gravel.
Figure 7B:
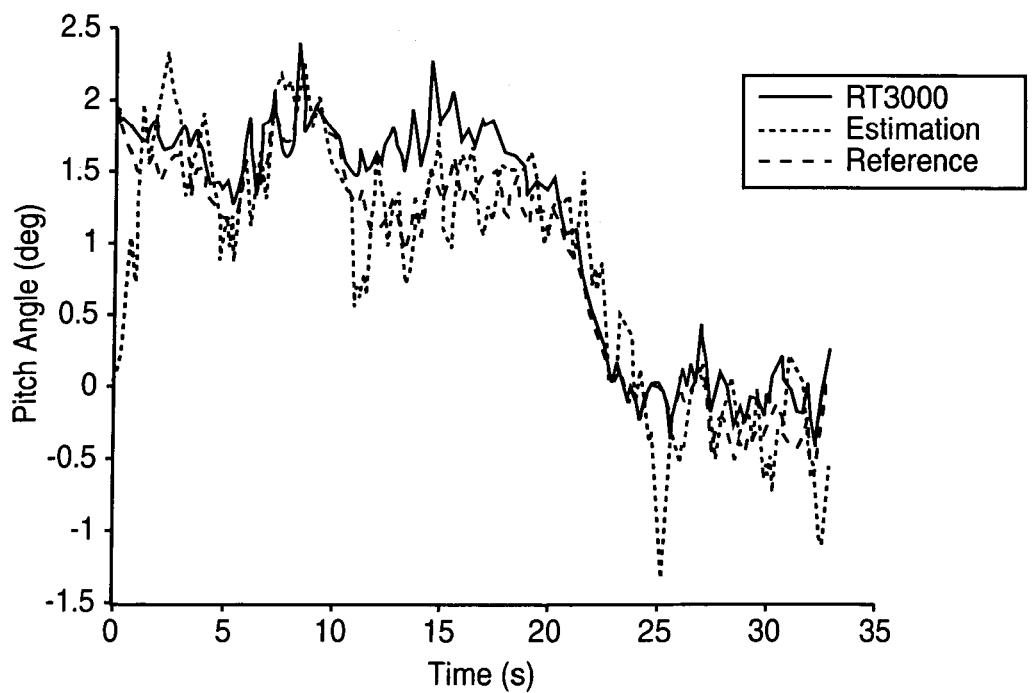
Figure 8A:
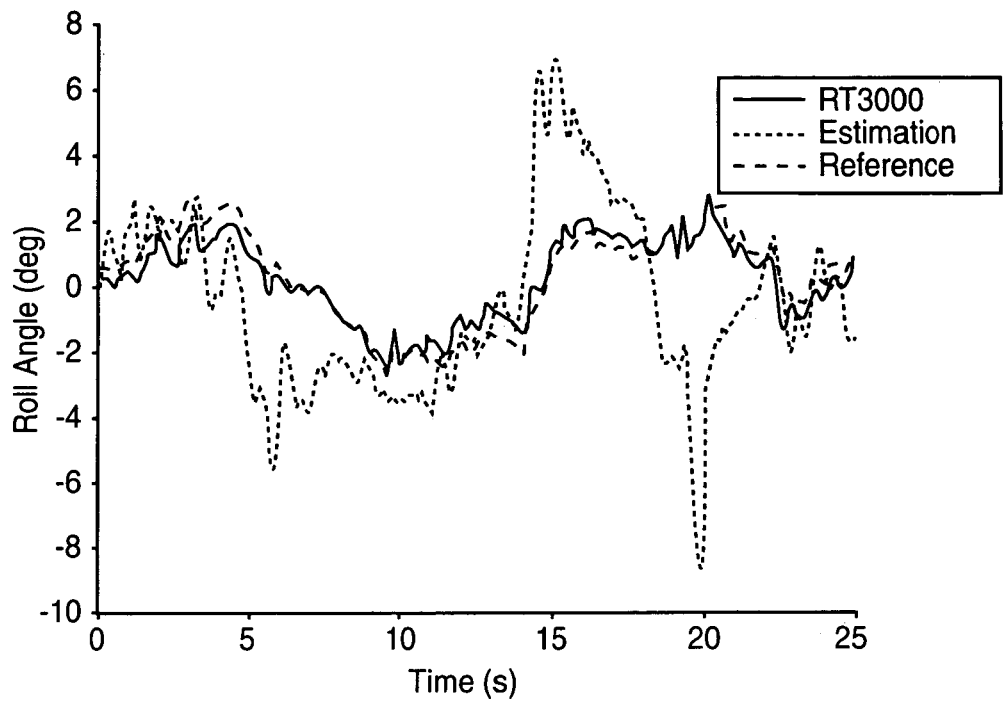
FIGS. 8A and 8B are respective roll angle and pitch angle plots versus time of a calculated reference, an estimation according to the present invention, and an accurate measuring device on packed snow.
Figure 8B:
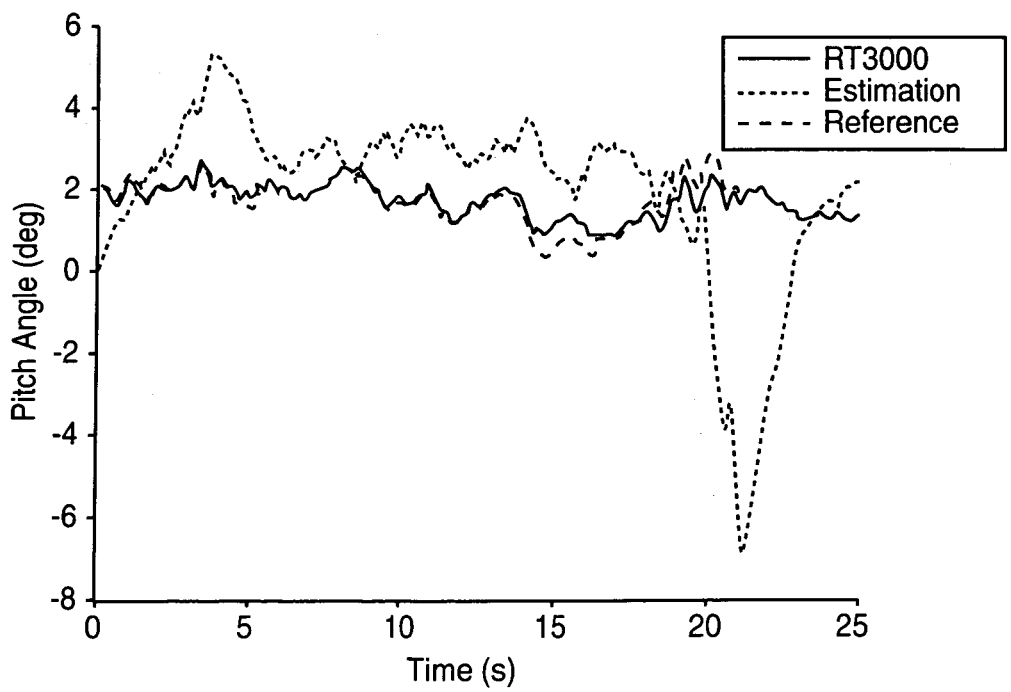

Referring now to FIG. 5, a method for determining the pitch and roll attitude angles are determined. In step 80 the various sensors are read. In the following description it is assumed that the sensor (IMU) in this embodiment is placed at the center of gravity and there is no misalignment with respect to the vehicle body frame.

Using the kinematic relationship between the sensors (IMU output) and the rates of changes of the Euler angles, and assuming that the rate of rotation of the earth is negligible, the state equations in step 82 for vehicle motion can be written as $$\dot{\theta}_x = \omega_x + (\omega_y \cdot \sin\theta_x + \omega_z \cdot \cos\theta_x) \cdot \tan\theta_y, \quad (1)$$

$$\dot{\theta}_y = \omega_y \cdot \cos\theta_x - \omega_z \cdot \sin\theta_x, \quad (2)$$

$$\dot{\theta}_z = (\omega_y \cdot \sin\theta_x + \omega_z \cdot \cos\theta_x) \cdot \sec\theta_y, \quad (3)$$

$$\dot{v}_x = \alpha_x + \omega_z \cdot v_y - \omega_y \cdot v_z + g \cdot \sin\theta_y, \quad (4)$$

$$\dot{v}_y = \alpha_y - \omega_z \cdot v_x + \omega_x \cdot v_z - g \cdot \sin\theta_x \cdot \cos\theta_y, \quad (5)$$

$$\dot{v}_z = \alpha_z + \omega_y \cdot v_x - \omega_x \cdot v_y - g \cdot \cos\theta_x \cdot \cos\theta_y, \quad (6)$$

in which $v = [v_x, v_y, v_z]^T$ represent velocities, $\omega = [\omega_x, \omega_y, \omega_z]^T$ represent angular velocities, $\alpha = [\alpha_x, \alpha_y, \alpha_z]^T$ represent accelerations, all in body frame; $\theta = [\theta_x, \theta_y, \theta_z]^T$ represent the three Euler angles, roll, pitch and yaw, respectively; g is the gravitational constant which is assumed to be known. Equations (1)–(6) are the fundamental equations that govern the 3-D motion of the vehicle.

For vehicle dynamic control purpose, the Euler yaw angle $\theta_z$ (or the heading) is not required. As can be seen, the yaw angle $\theta_z$ does not find its way into above equations except equation (3). Furthermore, since the vehicle is constrained to move on a surface, the vertical velocity $v_z$ is normally very small and can be neglected. Thus the estimation determination is based on the following reduced kinematic equations:

$$\dot{\theta}_x = \omega_x + (\omega_y \cdot \sin\theta_x + \omega_z \cdot \cos\theta_x) \cdot \tan\theta_y, \quad (7)$$

$$\dot{\theta}_y = \omega_y \cdot \cos\theta_x - \omega_z \cdot \sin\theta_x, \quad (8)$$

$$\dot{v}_x = \alpha_x + \omega_z \cdot v_y + g \cdot \sin\theta_y, \quad (9)$$

$$\dot{v}_y = \alpha_y - \omega_z \cdot v_x - g \cdot \sin\theta_x \cdot \cos\theta_y. \quad (10)$$

Theoretically, the vehicle attitude can be computed via mathematical integration of equations (7) and (8), supposing the initial condition is known and ωs are measured by gyro sensors. However in practice, direct integration intends to drift due to sensor bias and inevitable numerical errors. Absolute sensors such as GPS are always needed to constantly eliminate errors due to gyro integration. It is known to those skilled in the art that Kalman filters provide an optimal way to fuse IMU signals and absolute sensor signals. However, probabilistic information regarding the measurement and process noises is normally required.

As will be seen in this embodiment, a method that utilizes the measured accelerations, yaw rate, wheel speed and steering wheel angle to correct gyro integration is described. In other words, the dead reckoning sensors are used to provide information which is normally provided by absolute sensors such as GPS. As seen from equations (9) and (10), vehicle pitch and roll angle can be calculated if $v_x, \dot{v}_x, v_y$ and $\dot{v}_y$ were available:

$$\theta_y = \arcsin\left(\frac{\dot{v}_x - a_x - \omega_z \cdot v_y}{g}\right), \quad (11)$$

$$\theta_x = \arcsin\left(\frac{a_y - \omega_z \cdot v_x - \dot{v}_y}{g \cdot \cos\theta_y}\right). \quad (12)$$

Although it is possible to obtain fairly accurate $v_x$ and thus $\dot{v}_x$ from wheel speed sensors when wheel slip is small, $v_y$ and $\dot{v}_y$ are generally not available on current production vehicles.

Thus, equations (11) and (12) cannot be implemented. Fortunately, for a lot of maneuvers, $v_y$ or $\dot{v}_y$ may be small and thus can be neglected. In such cases, the so-called reference pitch and roll angles, $\hat{\theta}_{yref}$ and $\hat{\theta}_{xref}$, respectively, are determined in step 84 and are set forth in the following equations:

$$\hat{\theta}_{yref} = \arcsin\left(\frac{\dot{\hat{v}}_x - a_{xs}}{g}\right), \quad (13)$$

$$\hat{\theta}_{xref} = \arcsin\left(\frac{a_{ys} - \omega_{zs} \cdot \hat{v}_x}{g \cdot \cos\hat{\theta}_{yref}}\right), \quad (14)$$

where $\hat{v}_x$ represents the wheel speed based longitudinal velocity calculation, and $\dot{\hat{v}}_x$ its derivative; $\alpha_{xs}$ and $\alpha_{ys}$ represent longitudinal and lateral accelerometers measurements. One embodiment of refining the vehicle reference roll angle of equation (13) using steer angle, yaw rate, lateral acceleration, and longitudinal velocity can be found in U.S. Pat. No. 6,073,065, which is incorporated by reference herein.

Note that both $\hat{\theta}_{yref}$ and $\hat{\theta}_{xref}$ are independent of gyro measurement. Therefore they can be thought as "pseudo measurements" of the vehicle attitude, and will be used to eliminate errors due to gyro integration. Unlike the GPS measurements, these two reference signals are maneuver dependent with their noise co-variances unknown, which makes it difficult to apply a traditional Kalman filter. The following discrete-time nonlinear observer in step 86 is used to solve this technical difficulty:

$$\dot{\hat{\theta}}_y(k) = \omega_{ys}(k) \cdot \cos\hat{\theta}_x(k) - \omega_{zs}(k) \cdot \sin\hat{\theta}_x(k) + \Delta_{\theta_y}, \quad (15)$$

$$\dot{\hat{\theta}}_x(k) = \omega_{xs}(k) + [\omega_{ys}(k) \cdot \sin\hat{\theta}_x(k) + \omega_{zs}(k) \cdot \cos\hat{\theta}_x(k)] \cdot \tan\hat{\theta}_y(k) + \Delta_{\theta_x}, \quad (16)$$

where k represents the sampling instance, ô represents computed quantities, $o_{*s}$ represents measured quantities, and the adjustment $\Delta_{\theta_y}$ and $\Delta_{\theta_x}$ are defined in step 88 as:

$$\Delta_{\theta_y} = K_{\theta_y}(t) \cdot (\hat{\theta}_{yref} - \hat{\theta}_y), \quad (17)$$

$$\Delta_{\theta_x} = K_{\theta_x}(t) \cdot (\hat{\theta}_{xref} - \hat{\theta}_x), \quad (18)$$

in which $K_{\theta_y}$ and $K_{\theta_x}$ are non-negative tunable observer gains and $\hat{\theta}_y$ and $\hat{\theta}_x$ are calculated from equations (11) and (12). The observer gains must then be determined in step 90. The observer gains correspond to the stability of the vehicle. In step 92 the roll and pitch attitudes are determined by integration, such as the trapezoidal or other appropriate integration method:

$$\hat{\theta}_x(k) = \hat{\theta}_x(k-1) + \frac{\dot{\hat{\theta}}_x(k) + \dot{\hat{\theta}}_x(k-1)}{2} \cdot T_s, \quad (19)$$

$$\hat{\theta}_y(k) = \hat{\theta}_y(k-1) + \frac{\dot{\hat{\theta}}_y(k) + \dot{\hat{\theta}}_y(k-1)}{2} \cdot T_s, \quad (20)$$

where $T_s$ is the sampling period. It can be seen that when $K_{\theta_x} = K_{\theta_y} = 0$, the above scheme is equivalent to gyro integration. When $K_{\theta_x} > 0$ and $K_{\theta_y} > 0$, the estimates $\hat{\theta}_y$ and $\hat{\theta}_x$ exponentially converge to their references $\hat{\theta}_{yref}$ and $\hat{\theta}_{xref}$, respectively. The convergence rate and final accuracy can be adjusted by the observer gains.

The above scheme uses the observer equations (15)–(16) to blend the IMU gyro signals with the reference signals. Before integration, observer gains $K_{\theta y}$ and $K_{\theta x}$ are determined based on vehicle stability status. When the vehicle is stable, the reference signals are normally very accurate and the observer gains should be increased as a rule. In such cases, the reference signals are trusted more and the gyro integrations are trusted less. On the other hand, as the vehicle becomes unstable, the reference signals normally are not very reliable. The tunable observer gains should be reduced so that the estimates rely more on the gyro integrations. The variation in the amount of gain will vary by vehicle.

The determination of the vehicle stability status is needed in the proposed scheme. One embodiment of judging the lateral stability of a vehicle using steer angle, yaw rate, lateral acceleration, and longitudinal velocity is described in U.S. Pat. No. 6,073,065. A dynamic factor DNCF was proposed as an indicator of the magnitude of $\dot{v}_y$, the change of vehicle lateral velocity, and further as an indicator of the lateral stability of the vehicle. In the present invention, the DNCF calculation is further simplified, and a formula that reduces real-time computational load is given by:

$$DNCF = \frac{2\hat{v}_x^2}{g(L + k_u \cdot \hat{v}_x^2)} \cdot \left[ k_u \cdot a_{ys} + \frac{\omega_{zs}}{\hat{v}_x} \cdot L - \delta \right], \quad (21)$$

where L is wheelbase, $\delta$ is front wheel steering angle and $k_u$ is understeer coefficient. It is well know to those skilled in the art that the expression in the bracket is zero when the vehicle is undergoing a stable corning if the bicycle model and its nominal understeer coefficient is accurate.

There are many other variables that can be used to determine the vehicle stability, i.e., linear side slip angle of each axle ($\beta_{lin}$) steering wheel rate ($\dot{\delta}_H$), desired yaw rate ($\omega_{zd}$), measured yaw rate ($\omega_{zs}$) desired lateral acceleration ($\alpha_{yd}$), measured lateral acceleration ($\alpha_{ys}$) wheel slip ($\lambda$), driver brake request, ABS-in-cycle flag, TCS-in-cycle flag, etc. The observer gains or pitch and roll stability indexes can be scheduled by certain fuzzy logic, or in general, can be any appropriate functions of these variables, i.e., $$K_{\theta y}(t) = f_1(DNCF, \dot{\delta}_H, \lambda, \ldots), \quad (22)$$

$$K_{\theta x}(t) = f_2(DNCF, \dot{\delta}_H, \lambda, \ldots). \quad (23)$$

It is seen that the proposed scheme effectively utilizes the available information of a vehicle: the kinematic relationship among sensor signals, a bicycle model, and the nonholonomic constraints for the vehicle moving on a surface. The bicycle model basically provides information about quality of the reference signals and gyro integrations which are both independent of vehicle model. Thus the estimation accuracy is not directly affected by model uncertainties. In step 94 one, some, or all of the vehicle safety systems are controlled by the controller.

While the invention has been described in connection with one or more embodiments, it should be understood that the invention is not limited to those embodiments. On the contrary, the invention is intended to cover all alternatives, modifications, and equivalents, as may be included within the spirit and scope of the appended claims.

What is claimed is:

1. A system for controlling a safety system of an automotive vehicle comprising:

a longitudinal acceleration sensor generating a longitudinal acceleration signal;

a vehicle speed sensor generating a vehicle speed signal;

a lateral acceleration sensor generating a lateral acceleration signal;

a yaw rate signal generating a yaw rate signal; and a controller coupled to the longitudinal acceleration sensor, the vehicle speed sensor, the lateral acceleration sensor and the yaw rate sensor, said controller determining a reference pitch in response to the longitudinal acceleration signal and the vehicle speed signal and a reference roll angle in response to said yaw rate signal, the wheel speed signal and said lateral acceleration signal, said controller determining a roll stability index and a pitch stability index, said controller determining an adjusted pitch angle in response to the reference pitch angle and the pitch stability index and an adjusted roll angle in response to the reference roll angle and the roll stability index, said controller controlling the safety system in response to the adjusted roll angle and the adjusted pitch angle.

2. A system as recited in claim 1 wherein the wheel speed sensor comprises a plurality of wheel speed sensors.

3. A system as recited in claim 1 further comprising a steering angle sensor generating a steering angle signal, wherein the roll stability index is a function of the steering angle signal.

4. A system as recited in claim 1 further comprising a steering angle sensor generating a steering angle signal, wherein the pitch stability index is a function of the steering angle signal.

5. A system as recited in claim 1 wherein the safety system comprises an antilock-brake system, roll stability control system, a traction control system, a yaw control system.

6. A system as recited in claim 1 wherein the controller determines the pitch angle in response to a pitch observer.

7. A system as recited in claim 6 further comprising a pitch rate sensor generating a pitch rate signal, wherein the pitch observer is a function of pitch rate signal and the yaw rate signal.

8. A system for controlling a safety system of an automotive vehicle comprising:

a longitudinal acceleration sensor generating a longitudinal acceleration signal;

a vehicle speed sensor generating a vehicle speed signal; and a controller coupled to the longitudinal acceleration sensor and the vehicle speed sensor, said controller determining a reference pitch in response to the longitudinal acceleration signal and the vehicle speed signal, said controller determining a pitch stability index, said controller determining an adjusted pitch angle in response to the reference pitch angle and the pitch stability index, said controller controlling the safety system in response to the adjusted pitch angle.

9. A system as recited in claim 8 wherein the wheel speed sensor comprises a plurality of wheel speed sensors.

10. A system as recited in claim 8 further comprising a steering angle sensor generating a steering angle signal, wherein the pitch stability index is a function of the steering angle signal.

11. A system as recited in claim 8 wherein the controller determines the pitch angle in response to a pitch observer.

12. A system as recited in claim 11 further comprising a pitch rate sensor generating a pitch rate signal and a yaw rate sensor generating a yaw rate signal, wherein the pitch observer is a function of pitch rate signal and the yaw rate signal.

13. A system for controlling a safety system of an automotive vehicle comprising:
   a vehicle speed sensor generating a vehicle speed signal;
   a lateral acceleration sensor generating a lateral acceleration signal;
   a yaw rate signal generating a yaw rate signal; and
   a controller coupled to the vehicle speed sensor, the lateral acceleration sensor and the yaw rate sensor, said controller determining a reference roll angle in response to said yaw rate signal, said lateral acceleration signal and the wheel speed signal, said controller determining a roll stability index, said controller determining an adjusted roll angle in response to the reference roll angle and the roll stability index, said controller controlling the safety system in response to the adjusted roll angle.

14. A system as recited in claim 13 wherein the controller determines the roll angle in response to a roll observer.

15. A system as recited in claim 13 further comprising a roll rate sensor generating a roll rate signal and a pitch rate sensor generating a pitch rate signal, wherein the roll observer is a function of pitch rate signal, roll rate signal and the yaw rate signal.

16. A system as recited in claim 13 wherein the wheel speed sensor comprises a plurality of wheel speed sensors.

17. A system as recited in claim 13 further comprising a steering angle sensor generating a steering angle signal, wherein the roll stability index is a function of the steering angle signal.

18. A method of controlling a safety system comprising:
   determining a reference roll angle or a reference pitch angle,
   determining a roll stability index or a pitch stability index;
   providing a roll observer having a roll observer gain or a pitch observer having a pitch observer gain, said roll observer gain being a function of the reference roll angle and roll stability index and said pitch observer gain being a function of the reference pitch angle and the pitch stability index;
   integrating the roll observer to obtain a roll angle or the pitch observer to obtain a pitch angle; and
   controlling a safety system in response to the roll angle or the pitch angle.

19. A method as recited in claim 18 wherein determining a reference roll angle or a reference pitch angle comprises determining a reference pitch angle in response to a longitudinal acceleration signal and the vehicle speed signal.

20. A method as recited in claim 18 wherein determining a reference roll angle or a reference pitch angle comprises determining a reference roll angle in response to a yaw rate and a lateral acceleration.

21. A method as recited in claim 18 wherein determining a roll stability index or a pitch stability index comprises:
   determining a steering angle; and
   determining a roll stability index in response to the steering angle.

22. A method as recited in claim 18 wherein determining a roll stability index or a pitch stability index comprises:
   determining a steering angle; and
   determining a pitch stability index in response to the steering angle.

23. A method as recited in claim 18 wherein determining a roll stability index or a pitch stability index comprises:
   determining at least one of a side slip angle, a linear side sip angle, a steering wheel rate, a desired yaw rate, a measure yaw rate, a desired lateral acceleration, a measure lateral acceleration, a wheel slip a driver brake request, an abs-in-cycle flag and TCS-in cycle flag; and
   determining a roll stability index in response to at least one of a side slip angle, a linear side sip angle, a steering wheel rate, a desired yaw rate, a measure yaw rate, a desired lateral acceleration, a measure lateral acceleration, a wheel slip a driver brake request, an abs-in-cycle flag and TCS-in cycle flag.

24. A method as recited in claim 18 wherein determining a roll stability index or a pitch stability index comprises:
   determining at least one of a side slip angle, a linear side sip angle, a steering wheel rate, a desired yaw rate, a measure yaw rate, a desired lateral acceleration, a measure lateral acceleration, a wheel slip a driver brake request, an ABS-in-cycle flag and TCS-in cycle flag; and
   determining a pitch stability index in response to at least one of a side slip angle, a linear side sip angle, a steering wheel rate, a desired yaw rate, a measure yaw rate, a desired lateral acceleration, a measure lateral acceleration, a wheel slip a driver brake request, an abs-in-cycle flag and TCS-in cycle flag.

25. A method as recited in claim 18 wherein providing a roll observer having a roll observer gain or a pitch observer having a pitch observer gain comprises:
   determining a roll rate;
   determining a pitch rate;
   determining a yaw rate; and
   providing a roll observer in response to the roll rate, pitch rate, and yaw rate.

26. A method as recited in claim 18 wherein providing a roll observer having a roll observer gain or a pitch observer having a pitch observer gain comprises:
   determining a roll rate;
   determining a pitch rate;
   determining a yaw rate; and
   providing a pitch observer in response to the roll rate, pitch rate, and yaw rate.

27. A method of controlling a safety system comprising:
   determining a reference roll angle or a reference pitch angle,
   determining a roll stability index or a pitch stability index;
   providing a roll observer having a roll observer adjustment or a pitch observer adjustment, said roll observer adjustment determined in response to a roll observer gain and the reference roll angle, said pitch observer determined in response to the reference pitch angle and a pitch observer gain;
   integrating the roll observer to obtain a roll angle or the pitch observer to obtain a pitch angle; and
   controlling a safety system in response to the roll angle or the pitch angle.

28. A method s recited in claim 27 wherein providing a roll observer having a roll observer adjustment or a pitch observer adjustment comprises providing a roll observer having a roll observer adjustment or a pitch observer adjustment, said roll observer adjustment determined in response to a roll observer gain, the reference roll angle and a calculated roll angle, said pitch observer adjustment determined in response to the reference pitch angle, a pitch observer gain and a calculated pitch angle.

29. A method as recited in claim 27 wherein determining a reference roll or a reference pitch comprises determining a reference pitch in response to a longitudinal acceleration signal and the vehicle speed signal.

30. A method as recited in claim 27 wherein determining a reference roll or a reference pitch comprises determining a reference roll in response to a yaw rate and a lateral acceleration.

31. A method as recited in claim 27 wherein determining a roll stability index or a pitch stability index comprises:
  determining a steering angle; and
  determining a roll stability index in response to the steering angle.

32. A method as recited in claim 27 wherein determining a roll stability index or a pitch stability index comprises:
  determining a steering angle; and
  determining a pitch stability index in response to the steering angle.

33. A method as recited in claim 27 wherein providing a roll observer having a roll observer adjustment or a pitch observer having a pitch observer adjustment comprises:
  determining a roll rate;
  determining a pitch rate;
  determining a yaw rate; and
  providing the roll observer or the pitch observer in response to the roll rate, pitch rate, and yaw rate.

* * * * *

UNITED STATES PATENT AND TRADEMARK OFFICE
CERTIFICATE OF CORRECTION

PATENT NO. : 7,222,007 B2 Page 1 of 1
APPLICATION NO. : 10/752741
DATED : May 22, 2007
INVENTOR(S) : Li Xu et al.

It is certified that error appears in the above-identified patent and that said Letters Patent is hereby corrected as shown below:

Claim 28, Column 12, Line 57, should read as follows: -- 28. A method as recited in claim 27 wherein providing a --

Signed and Sealed this

Tenth Day of July, 2007

JON W. DUDAS
*Director of the United States Patent and Trademark Office*